United States Patent

Doi et al.

[11] Patent Number: 5,985,061
[45] Date of Patent: Nov. 16, 1999

[54] INORGANIC BOARD AND A METHOD OF MANUFACTURING SAID INORGANIC BOARD

[75] Inventors: Yoshitaka Doi, Tajimi; Masaki Kanai, Kuwana, both of Japan

[73] Assignee: Nichiha Corporation, Aichi, Japan

[21] Appl. No.: 08/377,028

[22] Filed: Jan. 20, 1995

[30] Foreign Application Priority Data

Oct. 31, 1994 [JP] Japan ................................ 6-292052

[51] Int. Cl.⁶ ............................ B32B 31/20; B32B 31/22
[52] U.S. Cl. .................. 156/42; 156/43; 156/45; 156/77; 156/220; 156/279; 156/327; 427/180; 427/198; 427/202; 427/264; 427/393.6; 427/403; 427/407.1
[58] Field of Search .................... 428/141, 143, 428/144, 145, 149, 150; 156/37, 42, 43, 44, 279, 45, 77, 327, 220; 427/180, 202, 403, 198, 264, 393.6, 407.1

[56] References Cited

U.S. PATENT DOCUMENTS 4,267,221 5/1981 Ishikawa .............................. 428/121

FOREIGN PATENT DOCUMENTS 55-078750A 6/1980 Japan .
56-017207A 2/1981 Japan .
3-141175 9/1991 Japan .

*Primary Examiner*—Elizabeth M. Cole
*Attorney, Agent, or Firm*—Donald S. Dowden; Cooper & Dunham, LLP

[57] ABSTRACT

An inorganic board consisting of an inorganic base layer formed by a paper making method and an inorganic surface layer formed by the dry method on said inorganic base layer is provided in the present invention. A synthetic resin emulsion and/or a rubber latex is coated on and permeates said inorganic base layer so as to supply the water to said inorganic surface layer and improve the delamination strength between said inorganic base layer and said inorganic surface layer.

3 Claims, 4 Drawing Sheets

INORGANIC BOARD AND A METHOD OF MANUFACTURING SAID INORGANIC BOARD

FIELD OF THE INVENTION

The present invention relates to an inorganic board and a method of manufacturing said inorganic board. More particularly, the present invention relates to an embossed inorganic board having a design with deep dents. Said inorganic board is used as a building material for such as siding.

DESCRIPTION OF THE PRIOR ART

An embossed inorganic board has been provided as a building material for such as siding. Hitherto, said inorganic board has been manufactured by the wet method or the semi-dry method. Said wet method comprises preparing a slurry including an inorganic curable material such as a cement and a reinforcing material such as a wood fiber, forming an inorganic layer by a paper making method, dehydrating the resulting inorganic layer by vacuum sucking or cylinder pressing, embossing said inorganic layer by an embossing roller or an embossing plate and incubating said embossed inorganic layer to cure said inorganic curable material in said inorganic layer.

On the other hand, said semi-dry method comprises preparing a powdery mixture of an inorganic curable material such as a cement and a reinforcing material such as a wood fiber, and said powdery mixture also containing water in an amount less than 40% by weight, spreading said powdery mixture on a mold panel to form an inorganic layer of said powdery mixture, pressing an embossing plate onto the resulting inorganic layer, incubating said embossed inorganic layer by pressing between said mold panel and said embossing plate to cure said inorganic curable material in said inorganic layer and removing said mold panel and said embossing plate from the resulting inorganic board.

When said wet method is employed to manufacture inorganic board, said inorganic board can be manufactured by the continuous process. Nevertheless, since said inorganic layer has a high density and a high structural strength due to vacuum sucking or cylinder pressing in the dehydration process, it is difficult to emboss a design with deep dents into said inorganic layer.

When said semi-dry method is employed to manufacture inorganic board, it is easy to emboss a design with deep dents into said inorganic layer since said inorganic layer formed on the mold plate has a low density. Nevertheless, it is impossible to manufacture said inorganic board by the continuous process since said inorganic layer is incubated between the mold panel and the embossing plate. Further, since one mold panel, one embossing plate and one pressing means should be prepared for one inorganic board, the manufacturing cost becomes high in said semi-dry method.

To resolve these problems, a method comprising forming an inorganic base layer by a paper making method, forming an inorganic surface layer on said inorganic base layer by the semi-dry method, embossing said inorganic surface layer of the resulting laminated layer and incubating said laminated layer to manufacture an inorganic board has been provided (TOKKAI SHO-61-171313, TOKKAI HEI-5-200713, TOKKAI HEI-5-200714). By employing the above described method, an embossed inorganic board having a design with deep dents can be manufactured by the continuous process.

Nevertheless, said method has a serious problem that the delamination strength between the inorganic base layer and the inorganic surface layer is very low so that the freezing-melting resistance of the resulting inorganic board is very low since moisture is apt to enter the boundary between the inorganic base layer and the inorganic surface layer. TOKKAI HEI 5-200713 discloses a means to improve the freezing-melting resistance of inorganic board by mixing an acrylic synthetic resin emulsion with the inorganic surface layer. Nevertheless, when said inorganic surface layer is embossed, said acrylic synthetic resin in said inorganic surface layer sticks to the surface of the embossing roller or the embossing plate, and as a result, it becomes difficult to release said inorganic board smoothly from said embossing roller or said embossing plate.

SUMMARY OF THE INVENTION

Accordingly, an object of the present invention is to provide an embossed inorganic board having a design with deep dents.

Another object of the present invention is to provide a method of manufacturing an embossed inorganic board having a design with deep dents wherein said embossed inorganic board is continuously manufactured.

A further object of the present invention is to provide an embossed inorganic board consisting of an inorganic surface layer and an inorganic base layer wherein said inorganic board has a high delamination strength between said inorganic surface layer and said inorganic base layer.

Said objects can be attained by providing an inorganic board consisting of an inorganic base layer formed by a paper making method and an inorganic surface layer formed by the dry method on said inorganic base method wherein a synthetic resin emulsion and/or a rubber latex is coated on and pregnates said inorganic base layer so as to supply the water to said inorganic surface layer and improve the delamination strength.

BRIEF DESCRIPTION OF THE DRAWINGS

FIG. 1 is an illustration of an embodiment of a long net paper making machine.

FIG. 2 is an illustration of an embodiment of the forming system of the inorganic surface layer.

FIG. 3 is an illustration of an embossing process.

FIG. 4 is a partial sectional view of a laminated layer.

DETAILED DESCRIPTION OF THE INVENTION

Figure 1:
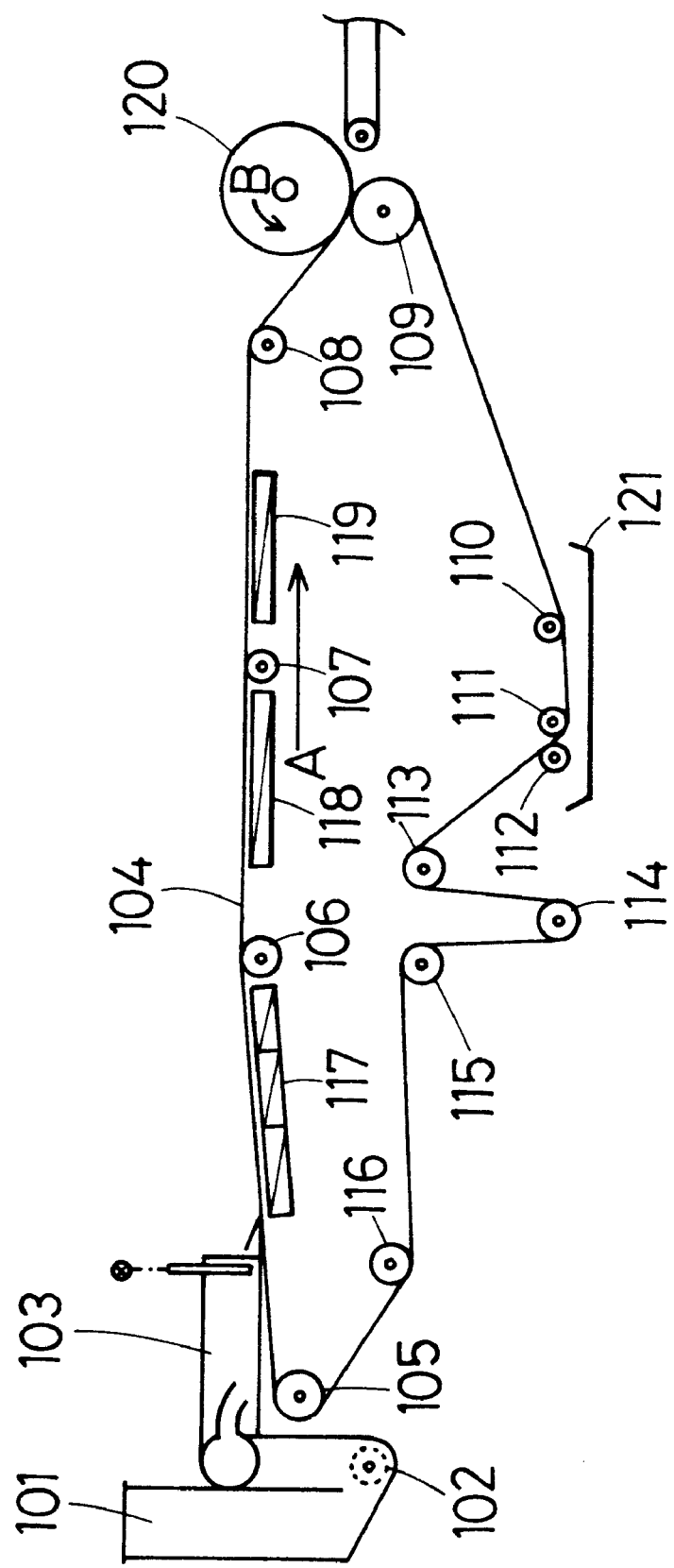
FIG. 1 to FIG. 4 relate to EXAMPLE 1 of the present invention.

The present invention relates to an inorganic board consisting of an inorganic base layer formed by a paper making method and on inorganic surface layer formed by the dry method on said inorganic base layer wherein a synthetic resin emulsion and/or a rubber latex is coated on and permeates said inorganic base layer so as to supply water to said inorganic surface layer and improve the delamination strength between said inorganic base layer and said inorganic surface layer.

Materials of the inorganic board

The inorganic board of the present invention consists of an inorganic base layer and an inorganic surface layer. The materials of said inorganic base layer and said inorganic surface layer include an inorganic curable material and a reinforcing material. Said inorganic curable material is such as Portland cement, blast furnace cement, fly ash cement, silica cement, alumina cement and the like.

Hitherto, asbestos has been used as a reinforcing material for inorganic board but serious environmental contamination is caused by using asbestos. Accordingly, at present, wood material is preferably used as a reinforcing material. Said wood material is such as wood powder, wood flake, wood pulp, wood fiber, bundled wood fiber, opened scrap paper, bamboo fiber, hemp fiber, palm fiber, bagasse, rice straw, wheat straw, chaff and the like. Besides said wood material, a synthetic fiber such as polyester fiber, polyamide fiber, acrylic fiber, acetate fiber, polyethylene fiber, polypropylene fiber and the like and an inorganic fiber such as glass fiber, carbon fiber, ceramic fiber and the like are also used as a reinforcing material in the present invention.

Besides said inorganic curing material and said reinforcing material, if desirable, an aggregate such as silica powder, silica sand, silica fume, silas balloon, pearlite, mica, expansive shale, expansive clay, diatomaceous, fly ash, blast furnace slag, gypsum powder, dolomite, bentonite, wollastonite, glass powder, silica clay, alumina, calcium carbonate, magnesium carbonate, coal cinders, sludge ash, crushed scrap of the inorganic board, silicon dust and the like may be used. Aggregate made of industrial wastes such as fly ash, coal cinders, sludge ash, crushed scrap of said inorganic board, silicon dust and the like is preferably used in the present invention. Said sludge ash is produced by the incineration treatment of sludge from sewage treatment, the filtration process in the food industry or the like, and said fly ash is collected from dust collectors in generating stations, and further said silicon dust is produced in the production process of ferrosilicone.

Further if desirable, a curing promoter such as calcium chloride, magnesium chloride, magnesium hydrochloride, aluminum sulfate, sodium alminate, water glass and thelike, a water-proofing agent such as wax, paraffine, silicone and the like is used.

Preparation of the mixture of the materials

In the mixture of the materials, said inorganic curable material is usually contained in an amount between 40 to 60% by weight, said reinforcing material is usually contained in an amount between 7 to 13%, and said aggregate is usually contained in an amount between 10 to 30% by weight. In a case where crushed scrap of the inorganic board is used, said crushed scrap can be added for up to 40% by weight. Since said crushed scrap of said inorganic board contains said reinforcing material, said reinforcing material in the mixture can be saved when said crushed scrap of said inorganic board is mixed. Further light aggregate such as silas balloon, pearlite, expansive shale, expansive clay, diatomaceous and the like is preferably mixed in the aggregate. Said light aggregate is mixed in the mixture of the materials in an amount between 7 to 15% by weight.

Forming of the inorganic base layer

The inorganic base layer in the present invention is formed by a paper making method or extrusion molding. In the case of said paper making method, a slurry including said mixture of the materials is prepared. Usually the solid content of said slurry is in the range between 5 to 15% by weight.

In a case where asbestos is used as a reinforcing material, asbestos gives good stability to the slurry in which said mixture of the materials is dispersed. Nevertheless, as above described, airborne pieces of asbestos injure health so that the use of asbestos should be avoided.

In a case where no asbestos is used as a reinforcing material, it is preferable to use synthetic fiber having a length in the range between 3 to 8 mm with wood pulp as said reinforcing material. By using said synthetic fiber, the slurry has good stability and an inorganic base layer having a uniform thickness can be formed. The inorganic base layer is formed by a paper making method using said slurry. The Hachek method, the long net method, the casting method and the like are used as the paper making method. After said inorganic base layer is formed on the net of the Hachek paper making machine, the long net paper making machine, the casting mold or the like, said inorganic base layer is dehydrated by vacuum sucking or cylinder pressing. Usually a few layers formed by said paper making method are laminated by a making roll after the dehydration process and the thickness of the resulting inorganic base layer is usually in the range between 13 to 20 mm.

In the case of extrusion molding, a kneaded mixture of the materials is prepared. Usually the solid content of said kneaded mixture is in the range between 40 to 75% by weight and said kneaded mixture is extruded by an extruder to form an inorganic base layer having a thickness in the range between 13 to 20 mm.

Coating of a synthetic resin emulsion and/or a rubber latex

The resulting inorganic base layer contains water usually in the range between 50 to 80% by weight and a synthetic resin emulsion and/or a rubber latex is coated on the surface of said inorganic base layer. To increase the permeability of said synthetic resin emulsion and/or said rubber latex into said inorganic base layer, it is preferable to form a porous surface on said inorganic base layer by using such as a needle roller, a needle plate or the like.

Said synthetic resin emulsion used in the present invention is such as acrylic resin, polystyrene resin, vinyl acetate resin, polyethylene resin, polypropylene resin, polyvinyl chloride resin, vinylidene chloride copolymer, ethylene-propylene copolymer, ethylene-vinyl acetate copolymer, and said rubber latex used in the present invention is such as chloroprene rubber, isoprene rubber, butadiene rubber, butyl rubber, styrene-butadiene rubber, acrylonitrile-styrene-butadiene ubber, acrylonitrile-butadiene rubber. Said synthetic resin emulsion and/or said rubber latex is coated on said inorganic base layer by a coating machine such as a spray gun, flow coater, roll coater, knife coater and the like and it is necessary that a suitable amount of said emulsion and/or said latex permeates said inorganic base layer and a suitable amount of said emulsion and/or said latex remains on the surface of said inorganic base layer. Permeability of said emulsion and/or said latex is dependent on the viscosity and/or the coating amount. Usually, the viscosity of said emulsion and/or said latex is adjusted by controlling the solid content. Although a desirable solid content depends on the kind of said emulsion and/or said latex, generally speaking, said desirable solid content of said emulsion and/or said latex is in the range between 1 to 22% by weight and a desirable coating amount is in the range between 16 to 200 g/m$^2$ as the solid of said emulsion and/or said latex. After coating, it is desirable to spread said coated emulsion and/or said coated latex uniformly on the surface of said inorganic base layer by using such as an air-knife to prevent the partial standing of said coated emulsion and/or said coated latex.

Forming of the inorganic surface layer

The inorganic surface layer in the present invention is formed by the dry method. Said mixture of the materials in which no water is added is used in said dry method or dry process and said mixture is spread on the inorganic base layer on which said emulsion and/or said latex is coated. Said mixture may contain the water contained originally in the materials and the absolute dry condition of said mixture is not necessary in the present invention. The spreading of said mixture is usually carried out by using such as a flat type sieve apparatus, a vibrating sieve apparatus, a spreading roller and the like and in a case where a spreading roller is used, it is desirable to spread said mixture uniformly blowing air against said spread mixture. The desirable spreading amount of said mixture, namely the weight of the resulting inorganic surface layer is in the range between 0.75 to 1.6 kg/m$^2$. In a case where the weight of the inorganic surface layer is less than 0.75 kg/m$^2$, it is difficult to form a design having deep dents by embossing and in a case where the weight of the inorganic surface layer is more than 1.6 kg/m$^2$, it is easy to form a design having deep dents by embossing but it is difficult to supply the water from said emulsion and/or said latex uniformly and in enough quantity to the inorganic surface layer and the curing of the resulting inorganic board does not proceed smoothly and adequately enough so as to result in a low mechanical strength of the product. Further, in a case where the weight of the inorganic surface layer is less than 0.75 kg/m$^2$, said emulsion and/or said latex permeates the surface of the inorganic surface layer and sticks to the surface of the embossing roller or the embossing plate.

In the case of the weight of the inorganic surface layer in said range, the thickness of said inorganic surface layer is in the range between 1.5 to 2.5 mm. Nevertheless, since no water is added in said spread mixture, no block is formed in said mixture so that said mixture is spread uniformly on the inorganic base layer.

As above described, the curing of the inorganic surface layer and the releasing ability of said inorganic surface layer from the embossing roller or embossing plate is also effected by the remaining amount of said emulsion and/or said latex. In a case where said remaining amount is not enough, the water from said emulsion and/or said latex is not supplied enough to the inorganic surface layer so the curing of the inorganic surface layer does not proceed smoothly while in a case where said remaining amount is excessive, said emulsion and/or said latex permeates the surface of the inorganic surface layer and sticks to the surface of the embossing roller or the embossing plate. Accordingly, it is desirable that the solid content and the coating amount of said emulsion and/or said latex is adjusted in the above described range.

Embossing

After forming the inorganic surface layer on the inorganic base layer, the resulting laminated layer is embossed by using an embossing roller or an embossing plate. In a case where an embossing roller is used, said embossing process can be carried out continuously. During said embossing process, water from said emulsion and/or said latex remaining on the surface of said inorganic base layer permeates the inorganic surface layer through the embossing pressure.

In the above described range of the solid content and the coating amount of said emulsion and/or said latex and in the above described range of the spread amount of said mixture, the water from said emulsion and/or said latex permeates uniformly into the inorganic surface layer but said emulsion and/or said latex does not permeate the surface of the inorganic surface layer.

Incubation

Said embossed laminated layer consisting of the inorganic base layer and the inorganic surface layer is then incubated to cure the inorganic curable material in said inorganic base layer and said inorganic surface layer. The autoclave incubation, the heating incubation and the natural incubation are applied to incubate said embossed laminated layer. As above described, said inorganic curable material is cured by the water supplied from said emulsion and/or said latex coated on the surface of said inorganic base layer during said incubation. Usually a temperature with a range between 50 to 85° C., the humidity in the range between 90 to 95% RH and an incubation time in the range between 7 to 18 hours are applied in said incubation process.

Embossed inorganic board

The resulting embossed inorganic board has a design with deep dents since the inorganic surface layer of said inorganic board is formed by the dry method and the continuous process can be applied to manufacture said inorganic board since said inorganic surface layer is formed on said inorganic base layer formed by a paper making method. Further, the resulting embossed inorganic board has a high delamination strength since the synthetic resin emulsion and/or the rubber latex is coated on and permeates said inorganic base layer of said inorganic board. Still further, since water is supplied to said inorganic surface layer from said emulsion and/or said latex, no water is added to the mixture of the material of said inorganic surface layer to form any block in said mixture during spreading said mixture so that said mixture is spread uniformly on said inorganic base layer to form an inorganic surface layer having a thin and uniform thickness and an inorganic surface layer having a thin and uniform thickness is smoothly cured during the incubation process in the presence of the water from said emulsion and/or said latex.

EXAMPLE 1

FIG. 1 shows an embodiment of a long net paper making machine. Referring to the figure, a slurry S in which materials of the inorganic base layer are dispersed is prepared and stored in a slurry tank (101) and said slurry S is stirred by a stirrer (102) and transferred to a flow box (103). Then said slurry S flows out onto a porous belt (104) such as a felt belt hung and supported on rollers (105), (106), (107), (108), (109), (110), (111), (112), (113), (114), (115) and (116), and rotated in the direction shown by the arrow A. On the underside of said porous belt (104) a plural number of suction boxes (117), (118) and (119) are contacted and the slurry that flows out onto said porous belt (104) is dehydrated by said suction boxes (117), (118) and (119) to form a layer. A few layers are laminated by a making roller (120) rotating in the direction shown by arrow B to form an inorganic base layer and the roller (109) is a back-up roller of said making roller (120). After said layer formed on said porous belt (104) is transferred to said making roller (120), said porous belt (104) is washed by water in a washing pan (121) and rollers (111) and (112) are squeezing rollers to squeeze the water from said porous belt (104). Further, said porous belt (104) is stretched by a roller (114) and said roller (114) is a tension roller.

Figure 2:
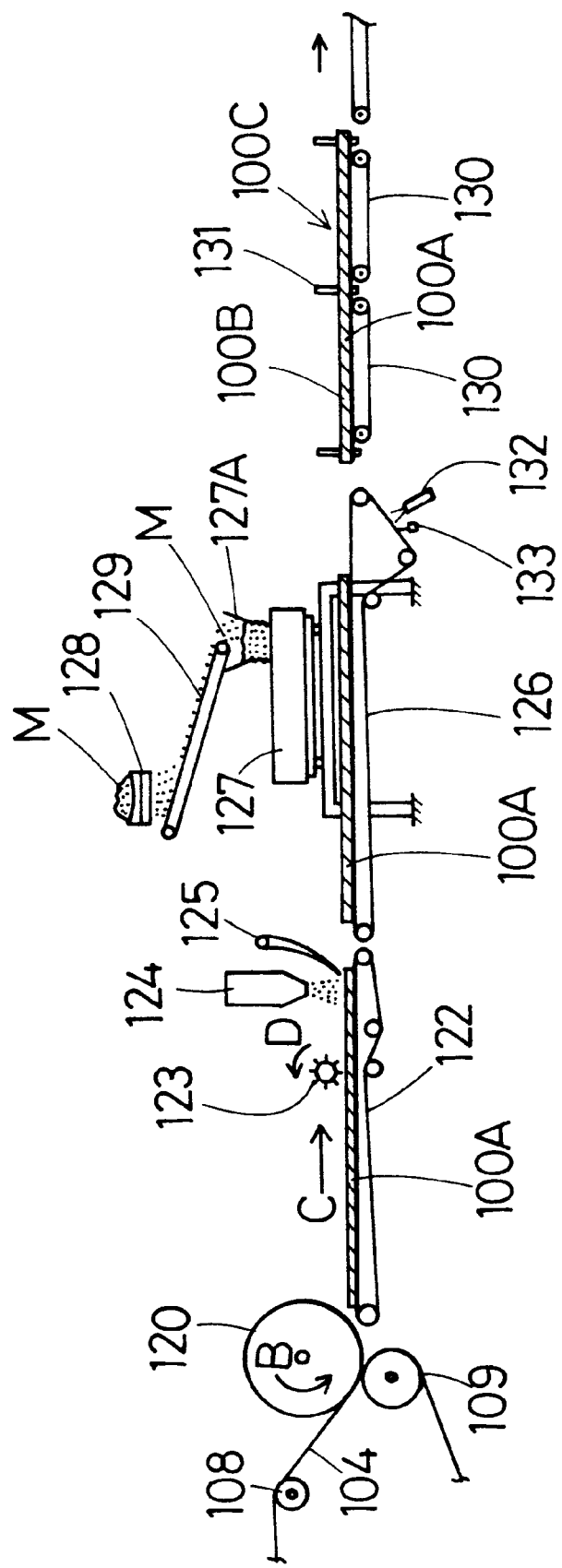

FIG. 2 shows an embodiment of the forming system of the inorganic surface layer. Said inorganic base layer (110A) formed by the long net paper making machine shown in FIG. 1 is transferred on a spreading conveyer (122) to be transported in the direction shown by arrow C and on said spreading conveyer (122), a porous surface of said inorganic base layer (100A) is formed by a needle roller (123) rotating in the direction shown by arrow D. A synthetic resin emulsion and/or a rubber latex in a flow coater (124) is coated on said porous surface of said inorganic base layer (100A) and said coated emulsion and/or latex is spread uniformly by an air-knife (125). Said coated inorganic base layer (100A) is then transferred on a transporting conveyer (126) and a mixture M of materials of the inorganic surface layer are spread on said inorganic base layer (100A) from a sieve apparatus (127). Said mixture M is supplied to a hopper (127A) from a mixture tank (128) through a conveyer (129). Thus an inorganic surface layer (100B) is formed on said inorganic base layer (100A) and the resulting laminated layer (100C) is transferred on a trimming conveyer (130) and trimmed by a trimming machine (131). After said laminated layer (100C) is transferred, said transporting conveyer (126) is washed by spraying with water from a washing nozzle (132) and squeezed by a squeezing blade (133).

Figure 3:
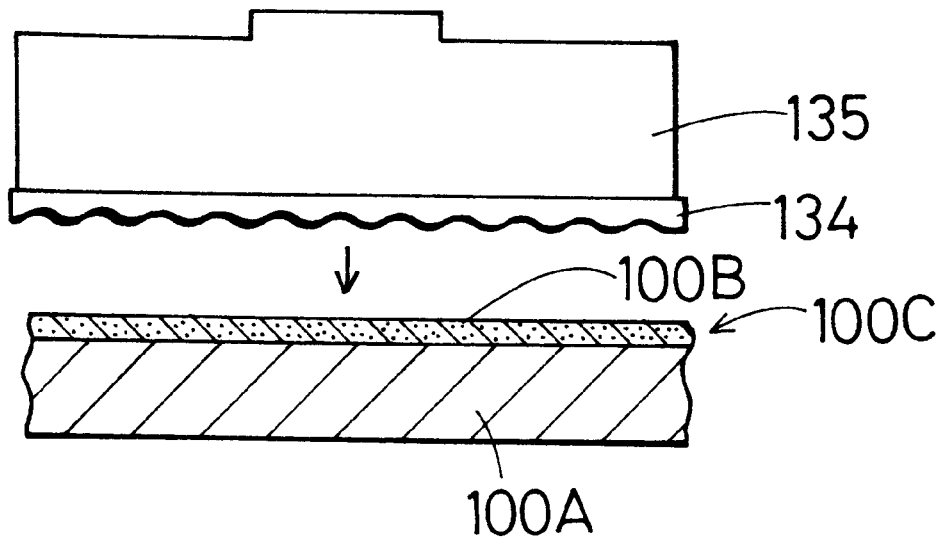
Figure 4:
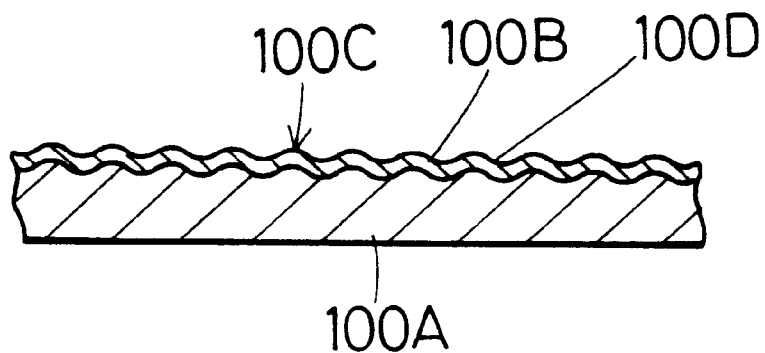

Said laminated layer (100C) is then embossed by an embossing plate (134) supported by a press machine (135) as shown in FIG. 3 to form an embossing design (100D) on the surface of said laminated layer (100C) as shown in FIG. 4. Said emulsion and/or latex coated on said inorganic base layer (100A) of said laminated layer (100C) permeates said inorganic surface layer (100B) by said pressing by said embossing plate (134) to supply water to the inorganic curable material in said inorganic surface layer (100B).

Figure 5:
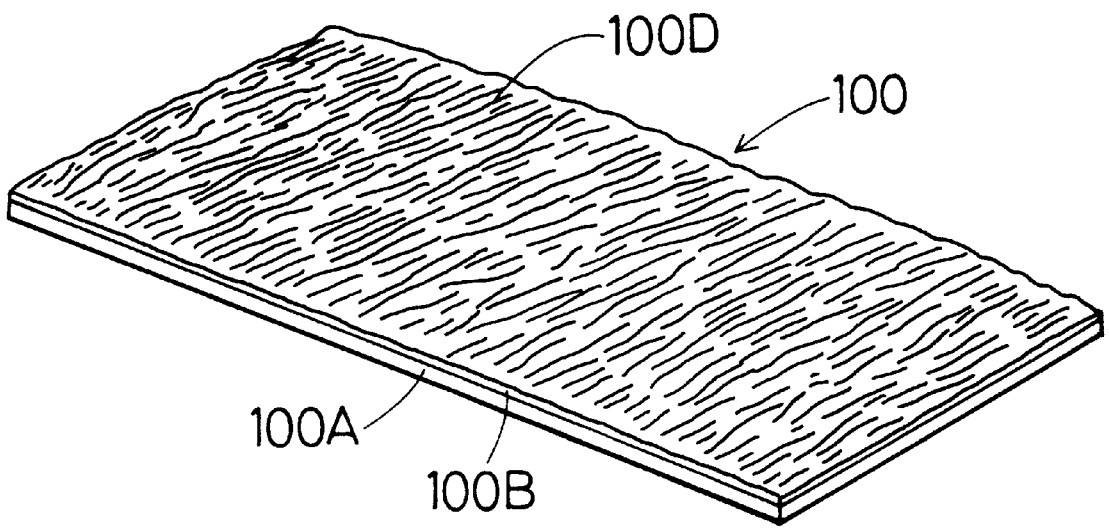
FIG. 5 is a perspective view of an inorganic board.

The resulting embossed laminated layer (100C) shown in said FIG. 4 is then incubated by heating to cure the inorganic materials in said inorganic layer (100A) and inorganic surface layer (100B) of said laminated layer (100C) to manufacture an embossed inorganic board (100) as shown in FIG. 5.

EXAMPLE 2

Figure 6:
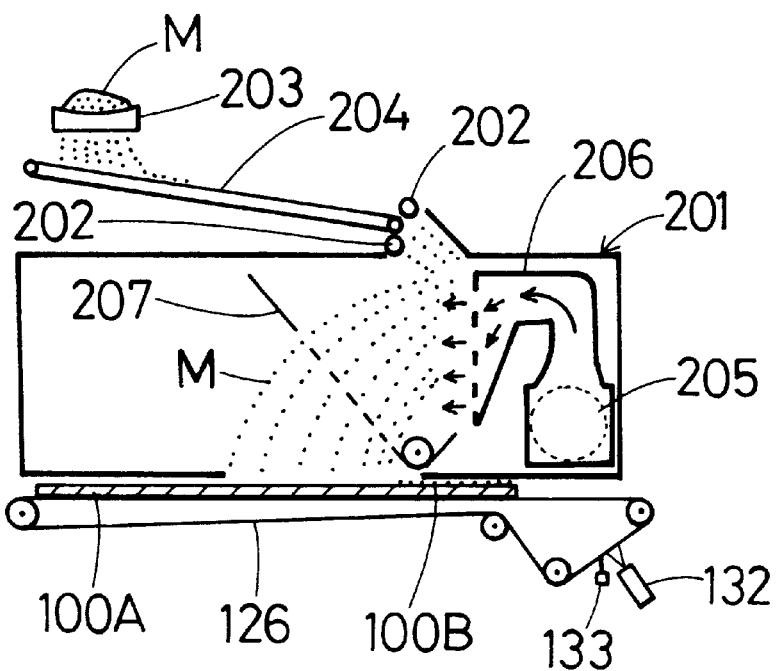
FIG. 6 is an illustration of another embodiment of the forming system of EXAMPLE 3.

FIG. 6 shows another embodiment of the forming system in the present invention.

Referring to the figure, a mixture M of materials of said inorganic surface layer is fed into a chamber (201) by a feeding roller (202). Said mixture M is supplied to said feeding roller (202) from a mixture tank (203) through a conveyer (204). In said chamber (201), air is blown against said fed mixture M from a fan (205) through a duct (206) and a filter (207) and said inorganic surface layer (100B) is formed on said inorganic base layer (100A) and transferred on the transporting conveyer (126).

EXAMPLE 3

Forming of the inorganic base layer

The following materials were dispersed in the water to prepare a slurry:

| Portland cement | 21.9% by weight |
|---|---|
| Blast furnace slag | 27.1 by weight |
| Fly ash | 10.0 by weight |
| Peralite | 9.2 by weight |
| Sludge ash | 2.0 by weight |
| Magnesium hydroxide | 2.8 by weight |
| Crushed scrap of inorganic board | 15.0 by weight |
| Ground pulp | 8.0 by weight |
| Kraft pulp | 3.5 by weight |
| Polypropylene fiber | 0.5 by weight |

The solid content of the resulting slurry was 10% by weight.

An inorganic base layer was formed by said slurry. The paper making method using the long net paper making machine of EXAMPLE 1 was employed to form said inorganic base layer. The thickness of the resulting inorganic base layer was 10 mm.

Coating of polyacrylate emulsion

A porous surface on said inorganic base layer was formed by the needle roller (123) shown in FIG. 2 and a diluted polyacrylate emulsion was coated on the surface of said inorganic base layer by the flow coater (124) shown in FIG. 2. The solid content of said diluted polyacrylate emulsion was 1% by weight and the coating amount of said diluted polyacrylate emulsion was 16.3 g/m$^2$ as the solid of said polyacrylate emulsion. Said coated polyacrylate emulsion was spread uniformly by the air-knife (125) as shown in FIG. 2.

Forming of the inorganic surface layer

The following materials were mixed to prepare a mixture of the materials:

| Portland cement | 32.5% by weight |
|---|---|
| Blast furnace slag | 34.1 by weight |
| Pearlite | 12.2 by weight |
| Fly ash | 12.0 by weight |
| Filler | 3.0 by weight |

Said mixture M was spread on the surface of said inorganic base layer on which said polyacrylate emulsion was coated as shown in FIG. 2 to form an inorganic surface layer. The spread amount of said mixture M on said inorganic base layer was 1.6 kg/m$^2$ and the thickness of the resulting inorganic surface layer was 2.5 mm.

Incubation

The resulting laminated layer consisting of said inorganic base layer and said inorganic surface layer was pressed between an embossing plate and a flat plate wherein said inorganic surface layer was pressed by said embossing plate and then said pressed laminated layer was incubated at 80° C., 90% RH for 15 hours.

After incubation, said plates were removed from said incubated laminated layer to obtain an inorganic board sample No. 1.

EXAMPLE 4

The same inorganic base layer having a porous surface as EXAMPLE 3 was used. A diluted styrene-butadien rubber (SBR) latex was coated on the surface of said inorganic base layer. The solid content of said diluted SBR latex was 1% by weight and the coating amount of said diluted SBR latex was 16.3 g/m$^2$ as the solid of said SBR latex. Said coated SBR latex was spread uniformly by the air-knife (125) as shown in FIG. 2.

To form an inorganic surface layer on the surface of said inorganic base layer on which said SBR latex was coated, the same mixture as EXAMPLE 3 was employed and the spread amount of said mixture and thickness of the resulting inorganic surface layer were respectively same as EXAMPLE3. The resulting laminated layer was pressed and incubated by the same manner as EXAMPLE 3 to obtain an inorganic board sample No. 2.

EXAMPLE 5

To form an inorganic base layer, a slurry in which the following materials were dispersed was prepared.

| Portland cement | 29.5% by weight |
|---|---|
| Blast furnace slag | 17.7 by weight |
| Fly ash | 11.8 by weight |
| Pearlite | 9.2 by weight |
| Sludge ash | 2.0 by weight |
| Magnesium hydroxide | 2.8 by weight |
| Crushed scrap of inorganic board | 15.0 by weight |
| Ground pulp | 8.0 by weight |
| Kraft pulp | 4.0 by weight |

The solid content of the resulting slurry was 10% by weight.

By employing said slurry, an inorganic base layer was formed by the casting method. The thickness of the resulting inorganic base layer was 10 mm.

The polyacrylate emulsion used in EXAMPLE 3 was also used in this EXAMPLE and said polyacrylate emulsion was coated on a surface of said inorganic base layer which was made porous by the same manner as EXAMPLE 3.

To form an inorganic surface layer on the surface of said inorganic base layer on which said polyacrylate emulsion was coated, the same mixture and the same manner as EXAMPLE 3 were employed and the resulting laminated layer was pressed and incubated by the same manner as EXAMPLE 3 to obtain an inorganic board sample No. 3.

EXAMPLE 6

To form an inorganic base layer, a slurry in which the following materials were dispersed was prepared:

| Portland cement | 20.6% by weight |
| --- | --- |
| Blast furnace slag | 8.9 by weight |
| Fly ash | 29.5 by weight |
| Pearlite | 9.2 by weight |
| Sludge ash | 2.0 by weight |
| Magnesium hydroxide | 2.8 by weight |
| Crushed scrap of inorganic board | 15.0 by weight |
| Ground pulp | 8.0 by weight |
| Kraft pulp | 3.5 by weight |
| Polypropylene fiber | 0.5 by weight |

The solid content of the resulting slurry was 10% by weight.

By employing said slurry, an inorganic base layer was formed by the casting method. The thickness of the resulting inorganic base layer was 10 mm.

The polyacrylate emulsion used in EXAMPLE 3 was also used in this EXAMPLE and said polyacrylate emulsion was coated on the surface of said inorganic base layer which was made porous by the same manner as EXAMPLE 3.

To form an inorganic surface layer on the surface of said inorganic base layer on which said polyacrylate emulsion was coated, the same mixture and the same manner as EXAMPLE 3 were employed and the resulting laminated layer was pressed by the same manner as EXAMPLE 3 and incubated in an autoclave at 150° C. for 7 hours to obtain an inorganic board sample No. 4.

EXAMPLE 7

The same inorganic base layer having a porous surface as EXAMPLE 6 was used.

The same SBR latex as EXAMPLE 4 was used and said SBR latex was coated on the porous surface of said inorganic base layer by the same manner as EXAMPLE 4 and the same mixture as EXAMPLE 3 was employed to form an inorganic surface layer on said inorganic base layer by the same manner as EXAMPLE 3. The resulting laminated layer was pressed and incubated by the same manner as EXAMPLE 6 to obtain an inorganic board sample No. 5.

EXAMPLE 8

To form an inorganic base layer, a slurry in which the following materials were dispersed was prepared.

| Portland cement | 20.6% by weight |
| --- | --- |
| Blast furnace slag | 8.9 by weight |
| Silica powder | 29.5 by weight |
| Pearlite | 9.2 by weight |
| Sludge ash | 2.0 by weight |
| Magnesium hydroxide | 2.8 by weight |
| Crushed scrap of inorganic board | 15.0 by weight |
| Ground pulp | 8.0 by weight |
| Kraft pulp | 3.5 by weight |
| Polypropylene fiber | 0.5 by weight |

The solid content of the resulting slurry was 10% by weight.

The same manner as EXAMPLE 6 was employed to form an inorganic base layer and the same polyacrylate emulsion as EXAMPLE 3 was used. To form an inorganic surface layer, the same mixture and manner as EXAMPLE 3 were employed. The resulting laminated layer was pressed and incubated by the same manner as EXAMPLE 6 to obtain an inorganic board sample No. 7.

COMPARISON 1

An inorganic board sample No. 3C was manufactured by the same materials and manner as EXAMPLE 5 excepting that water was used instead of said polyacrylate emulsion.

COMPARISON 2

An inorganic board sample No. 6C was manufactured by the same materials and manner as EXAMPLE 8 excepting that water was used instead of said polyacrylate emulsion.

ESTIMATION OF PROPERTIES OF SAMPLES

The properties of each of the inorganic board samples Nos. 1, 2, 3, 4, 5, 6, 3C and 6C was estimated and the results are shown in Table 1.

Referring to Table 1, it is clear that each of the samples Nos. 1, 2, 3, 4, 5 and 6 has an excellent freezing-thaw property since the synthetic resin emulsion or rubber latex was coated on the inorganic base layer while each of the samples Nos. 3C and 6C has a poor freezing-thaw property since neither synthetic resin emulsion nor rubber latex was coated on the inorganic base layer.

TABLE 1

| Sample No. | 1 | 2 | 3 | 3C | 4 | 5 | 6 | 6C |
| --- | --- | --- | --- | --- | --- | --- | --- | --- |
| Properties | | | | | | | | |
| Density | 0.91 | 0.91 | 0.91 | 0.90 | 0.88 | 0.87 | 0.92 | 0.92 |
| Bending strength (MPa) | 12.2 | 12.2 | 10.5 | 10.3 | 8.5 | 8.3 | 12.0 | 11.8 |
| Tensile strength (MPa) | 0.95 | 0.85 | 0.88 | 0.69 | 0.90 | 0.87 | 0.91 | 0.61 |
| Water absorption test (%)[*1] | 0.25 | 0.23 | 0.20 | 0.13 | 0.13 | 0.14 | 0.15 | 0.18 |
| Freezing-thaw test (%)[*2] | 1.21 | 1.18 | 0.95 | 4.3 | 1.5 | 1.3 | 1.8 | 5.6 |
| Depth of emboss (mm) | 3.5–4.0 | 3.5–4.0 | 3.5–4.0 | 3.5 | 3.5–4.0 | 3.5–4.0 | 3.5–4.0 | 3.5–4.0 |
| General estimation | ○ | ○ | ○ | x | ○ | ○ | ○ | x |

[*1]Water absorption test: Each sample was emersed in water for 15 days at room temperature. The elongation ratio of each sample after emersion in water was determined.
[*2]Freezing-thaw test: By ASTM C-666.

We claim:

1. A method of manufacturing an inorganic board having an inorganic base layer, a coating selected from the group consisting of a synthetic resin emulsion and a rubber latex on and permeating said inorganic base layer, and an inorganic surface layer over said coating, said method comprising:

preparing a slurry in which a mixture of materials of said inorganic base layer substantially consisting of an inorganic curable material and a reinforcing material is dispersed, forming said inorganic base layer by a paper making method using said slurry, applying said coating to the resulting inorganic base layer, forming said inorganic surface layer on said coating by spreading a mixture of materials of said inorganic surface layer substantially consisting of an inorganic curable material and a reinforcing material without adding water, and embossing said surface layer and incubating said embossed surface layer, wherein said inorganic curable material in said inorganic surface layer is cured with water from said coating on said inorganic base layer.

2. A method in accordance with claim 1 wherein a porous surface is formed on said inorganic base layer before applying said coating.

3. A method in accordance with claim 1 wherein said coating is spread uniformly on said inorganic base layer by an air-knife before said inorganic surface layer is formed.

* * * * *